(12) United States Patent
Hartmann et al.

(10) Patent No.: US 7,621,594 B2
(45) Date of Patent: Nov. 24, 2009

(54) AIR SUPPLY MECHANISM FOR A VEHICLE SEAT, AND METHOD FOR THE OPERATION THEREOF

(75) Inventors: Dietmar Hartmann, Deckenpfronn (DE); Karl Pfahler, Stuttgart (DE); Lothar Renner, Nufringen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 11/630,244

(22) PCT Filed: Jun. 18, 2005

(86) PCT No.: PCT/EP2005/006614

§ 371 (c)(1),
(2), (4) Date: Aug. 22, 2007

(87) PCT Pub. No.: WO2006/000363

PCT Pub. Date: Jan. 5, 2006

(65) Prior Publication Data

US 2008/0136221 A1    Jun. 12, 2008

(30) Foreign Application Priority Data

Jun. 25, 2004   (DE) .................. 10 2004 030 707

(51) Int. Cl.
*A47C 7/72* (2006.01)
(52) U.S. Cl. .................. 297/180.12; 219/217; 454/120
(58) Field of Classification Search ............ 297/180.12; 219/202, 217; 454/120
See application file for complete search history.

(56) References Cited

U.S. PATENT DOCUMENTS 4,538,760 A    9/1985   Kobayashi (Continued)

FOREIGN PATENT DOCUMENTS

DE    1 123 220    8/1962

(Continued)

OTHER PUBLICATIONS

International Search Report dated Nov. 7, 2006 including an English Translation of the pertinent portions (Twelve (12) pages).

(Continued)

*Primary Examiner*—Anthony D Barfield
(74) *Attorney, Agent, or Firm*—Crowell & Moring LLP

(57) ABSTRACT

The present invention discloses an air supply mechanism for a vehicle seat (12), and a method for the operation thereof. The air supply mechanism comprises a control device (24), for driving a fan (38) and a heating element (39) connected downstream of the fan (38). When the air supply mechanism is switched on, the control device (24) switches on a heating element (39) and at the same time carries out a starting control of a fan (38) in such a manner that the fan (38) starts and is operated at minimum blower speed for a predetermined period of time before the blower speed is raised to a predetermined working point and subsequently the blower speed is regulated as a function of the driving speed. In this manner, a seat occupant does not experience an initial sensation of draft due to a powerful discharge of relatively cold air but rather experiences a pleasant warmth even directly after the mechanism is switched on.

12 Claims, 3 Drawing Sheets

U.S. PATENT DOCUMENTS

| | | | |
|---|---|---|---|
| 4,572,430 | A | 2/1986 | Takagi et al. |
| 5,002,336 | A | 3/1991 | Feher |
| 5,102,189 | A | 4/1992 | Saito et al. |
| 5,137,326 | A | 8/1992 | George |
| 6,342,770 | B1 | 1/2002 | Stephan et al. |
| 6,761,399 | B2 * | 7/2004 | Bargheer et al. ....... 297/180.12 |
| 2002/0057006 | A1 * | 5/2002 | Bargheer et al. ....... 297/180.14 |

FOREIGN PATENT DOCUMENTS

| | | |
|---|---|---|
| DE | 34 23 657 A1 | 3/1985 |
| DE | 36 09 095 C2 | 10/1986 |
| DE | 87 00 003.2 U | 4/1987 |
| DE | 39 25 809 A1 | 2/1991 |
| DE | 196 54 370 C1 | 1/1998 |
| DE | 197 03 516 C1 | 5/1998 |
| DE | 198 42 979 C1 | 12/1999 |
| DE | 199 36 755 A1 | 2/2001 |
| DE | 199 53 385 A1 | 5/2001 |
| DE | 102 26 008 A1 | 1/2004 |
| GB | 2 273 212 A | 6/1994 |
| JP | 54-99241 U | 7/1979 |
| JP | 56-14713 U | 2/1981 |
| JP | 61-253239 A | 11/1986 |
| JP | 1-99266 U | 7/1989 |
| JP | 3-64552 U | 6/1991 |
| JP | 7-266841 A | 10/1995 |
| WO | WO 03/106215 A1 | 12/2003 |

OTHER PUBLICATIONS

German Office Action dated Mar. 31, 2005 (Two (2) pages).
Translator's English language abstract of JP 3-64552 U previously submitted on Jul. 2, 2008.
Mechanical English language abstract of JP 3-64552 U previously submitted on Jul. 2, 2008.
Translator's English language abstract of JP 1-99266 U previously submitted on Jul. 2, 2008.
Mechanical English language abstract of JP 1-99266 U previously submitted on Jul. 2, 2008.
Translator's English language abstract of JP 54-99241 previously submitted on Jul. 2, 2008.
Translator's English language abstract of JP 56-14713 U previously submitted on Jul. 2, 2008.
English language translation of DE 1 123 220 previously submitted on Jul. 2, 2008.
English language abstract of DE 36 09 095 previously submitted on Jul. 2, 2008.
English language translation of DE 87 00 003.2 U1 previously submitted on Jul. 2, 2008.
English language abstract of DE 39 25 809 A1 previously submitted on Jul. 2, 2008.
English language abstract of DE 34 23 657 A1 previously submitted on Jul. 2, 2008.
German Office Action dated Sep. 30, 2008 (Three (3) pages).

* cited by examiner

AIR SUPPLY MECHANISM FOR A VEHICLE SEAT, AND METHOD FOR THE OPERATION THEREOF

BACKGROUND AND SUMMARY OF THE INVENTION

This invention relates to an air supply mechanism for a vehicle seat, and to a method for the operation thereof.

German document DE 102 26 008 A1 discloses an air supply mechanism for a vehicle seat of an open vehicle with at least one air discharging opening which is provided in the upper region of the vehicle seat and via which the head, shoulder and neck region of the seat occupant can be subjected to an air flow in order to reduce undesirable draft phenomena. In this case, the air flow can be regulated by means of a control device and, when the air supply mechanism is switched on, is set as a function of an automatically detected external parameter value, for example, an external temperature, or a specified value which can be selected by the seat occupant, to an assigned basic value. From this assigned basic value, a further setting of the air flow takes place as a function of an automatically detected further parameter value, for example, the driving speed. The two parameter values serve to set a low, average or a high basic value of the air flow, which basic value is determined by an assigned blower speed of the fan and an assigned heating power of the heating element. On the basis of this basic value, the setting of the air flow then takes place as a function of the driving speed in such a manner that, as the driving speed increases, the air flow and therefore the blower speed and the heating power of the heating element are increased, and vice versa.

However, in the above-described conventional vehicle seat with seat heating system and ventilation device (air supply mechanism), there is the problem that, when the air supply mechanism is switched on, the seat heating system and the ventilation device are activated and, as a result, directly after the mechanism is switched on, relatively cool air arrives at the shoulder and neck region of the seat occupant, since the heating element is not yet at the full heating power. This results in the seat occupant experiencing a draft and therefore leads to a loss of comfort.

German document DE 198 42 979 C1 discloses a vehicle seat with seat heating system and ventilation device, in which, each time the seat heating system is switched on, the control unit simultaneously activates the ventilation device for a defined period of time after the seat heating system is switched on. In this case, the seat heating system and the ventilation device are switched on at full power, and the power of the ventilation device is reduced asymptotically to a predetermined final value within the period of time. This final value can either be zero or a value predetermined manually depending on the sensation of heat. This results in a specific combination of seat heating and seat ventilation in the heating-up phase of the vehicle seat, causing the rate at which the cushion heats up in comparison to just the heating of the seat to be doubled. The seat heating system comprises a plurality of electric heating wires which are laid in an upholstery padding of the cushion. The ventilation device has a plurality of miniature fans. The fans are arranged in air ducts integrated in the cushion and suck up air from the vehicle interior region located below the vehicle seat and blow it into a ventilation layer of the cushion located below the upholstery padding.

German document DE 197 03 516 C1 discloses a vehicle seat with a seat heating system and ventilation device, in which the control unit is connected on the input side to a temperature sensor arranged in the cushion and on the output side to the seat heating system and the ventilation device. The ventilation device has a plurality of miniature fans which are integrated in a cushion pad, suck up air from the vehicle interior region located below the vehicle seat and blow it into a ventilation layer which covers the cushion pad and is composed of a spacer knit. The seat heating system comprises a plurality of heating coils which are in each case assigned to a miniature fan and are arranged together with the latter in a respective air duct formed in the cushion pad. The control unit drives the ventilation device and the seat heating system in various combinations of fan and heating stages as a function of a current cushion temperature and a predetermined desired cushion temperature.

The vehicle seat which is disclosed in German document DE 199 53 385 A1 has a seat heating system and ventilation device. An operating device is provided for the manual actuation of the seat heating system and of the ventilation device. If the ventilation device is switched on manually, the control unit regulates the seat heating system automatically as a function of the temperature of the seat surface. The ventilation device and the seat heating system can be switched in a stepwise manner and/or continuously by means of the operating device. Regulation takes place within the defined limits set by the user via the operating device. In addition, it is ensured that supercooling does not take place by means of the ventilation device by, when the ventilation device is switched on, the heating device for heating the vehicle seat being regulated automatically as a function of the seat surface temperature.

Also in such a conventional vehicle seat with a seat heating system and a ventilation device, when the seat heating system and the ventilation device are switched on, the heating element is not yet at the full heating power. The seat occupant, therefore, experiences a draft, in particular in the situation in which the ventilation device is initially operated at the maximum level and is then slowly switched down to a predetermined value.

It is therefore the object of the present invention to develop an air supply mechanism for a vehicle seat and a method for the operation thereof so that, even directly after the air supply mechanism is switched on, the seat occupant does not experience any draft.

According to the invention, this object is achieved both by an air supply mechanism for a vehicle seat as claimed and by a method for the operation of an air supply mechanism for a vehicle seat as claimed. Advantageous developments of the invention are also claimed.

By starting control according to the invention of the fan directly after the air supply mechanism for a vehicle seat is switched on, the seat occupant does not experience an initial sensation of draft due to a powerful discharge of relative cold air, but rather feels a pleasant warmth even directly after the mechanism is switched on.

This and further objects, features and advantages of the present invention become obvious from the description below of a preferred exemplary embodiment in conjunction with the drawings.

DETAILED DESCRIPTION OF THE INVENTION

The air supply mechanism for a vehicle seat and the method according to the invention for the operation of the same will now be described in more detail below with reference to a preferred embodiment.

Figure 1:
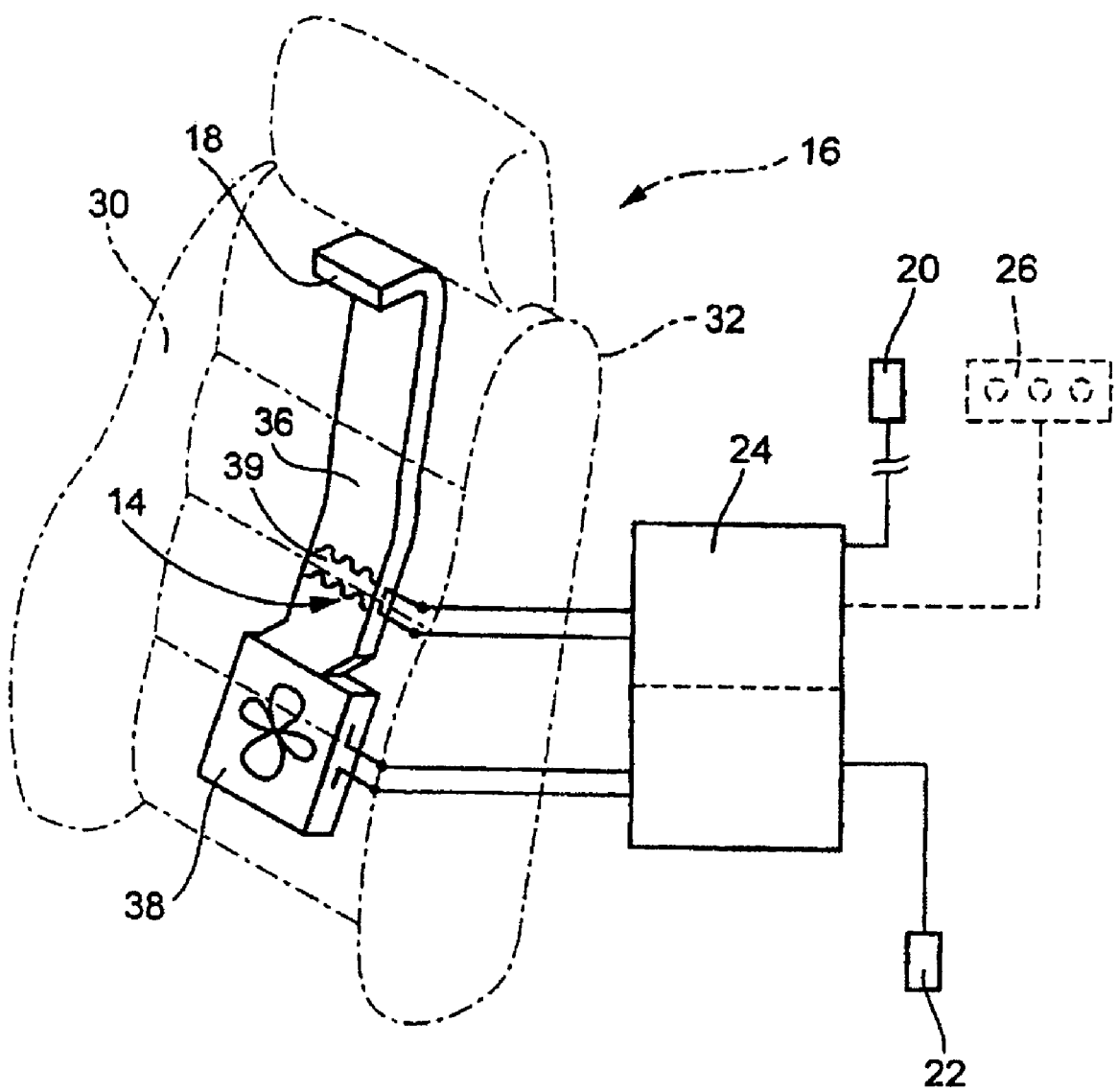
FIG. 1 shows a diagrammatic perspective view of parts of a backrest of a vehicle seat in which an air supply mechanism is integrated.

FIG. 1 illustrates, in a diagrammatic perspective view, parts of a backrest 16 of a vehicle seat in which an air supply mechanism 14 is integrated. Of the backrest 16 of the vehicle seat, a backrest frame 30 and a rear lining 32 can be seen. A duct arrangement 36 of the air supply mechanism 14 is arranged within the backrest 16. Connected upstream of the duct arrangement 36 is a fan 38 which is held by a housing and the air intake of which takes place on the rear side of the backrest 16. In addition, a heating element 39, which is connected downstream of the fan 38, which can be controlled via a control device 24, and with which the temperature of the air flow of the air supply mechanism 14 can be controlled, is arranged within the duct arrangement 36. In the region of the head restraint (not shown in FIG. 1), the duct arrangement 36 opens into an air discharging opening 18 through which the temperature-controlled air flow emerges in the direction of the head, shoulder and neck region of the seat occupant in order to considerably reduce the draft phenomena occurring, for example, when driving with the folding top open. The air discharging opening 18 ends in a manner integrated approximately flush with the front side of the head restraint.

The air supply mechanism 14 is connected both to a sensor 20 for detecting the external temperature and to a sensor 22 for detecting the driving speed. The two sensors 20, 22 are connected to the control device 24 which is arranged, for example, within the vehicle seat 12 and via which the air flow emerging from the air discharging opening 18 is regulated in the manner described below. In addition, a regulating device 26 is provided in the interior of the motor vehicle and is connected to the control device 24 and via which the seat occupant can undertake a setting of the air flow as described below. In the exemplary embodiment shown here, the driving speed is detected by an ABS control unit which is present in any case, converts the driving speed at a particular moment into an electronic signal and transmits it to the control device 24. The external temperature can be detected by a temperature sensor 20 which is present in any case for indicating the temperature in the cockpit, the temperature being converted into an electronic signal and being transmitted to the control device 24 in the vehicle seat 12.

Figure 2:
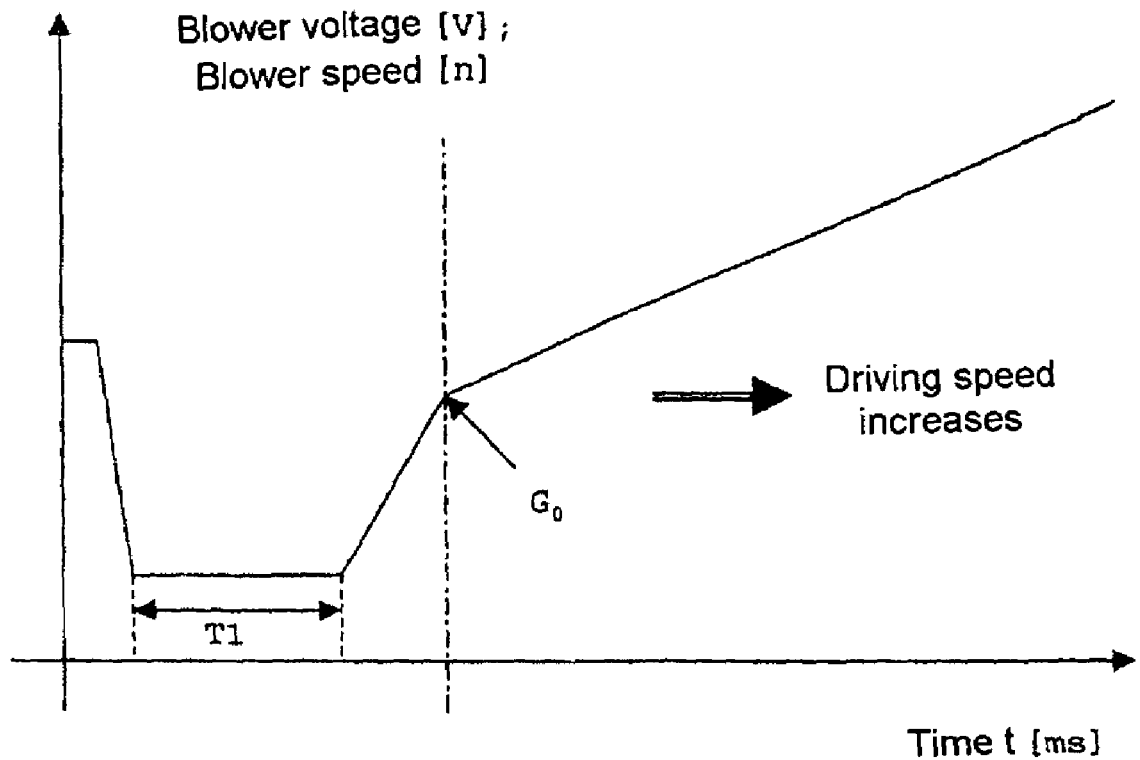
FIG. 2 shows a fan characteristic.

As soon as the control device 24 receives a switching-on signal for the air supply mechanism, for example, manually on the basis of an actuation of a switch by the occupant, the heating element 39 is switched on and at the same time the fan 38 is driven in accordance with the fan characteristic shown in FIG. 2. In this case, the fan 38 is started, as is apparent from FIG. 2, by means of a high, short voltage pulse. This high, short voltage pulse may be, for example, 3 V and last 0.5 s, and is sufficient in order to start the fan. Subsequently, the voltage is significantly lowered again to an operating minimum, of, for example, 1 V, and is kept to this for a predetermined period of time T1, for example 20 s, so that only a minimum possible blower speed $n_{min}$ is obtained. After expiry of this period of time, the operating voltage is then brought up to a predetermined working point $G_0$. The predetermined working point $G_0$ can be selected in this case on the basis of an automatically detected external parameter value, such as, for example, the external temperature, and can also be adapted during the driving mode at regular intervals in response to possible external temperature changes. The fan 38 is subsequently driven as a function of speed, i.e. as a function of the starting signal of the sensor 22 for detecting the driving speed, so that when the fan voltage and therefore the blower speed n are higher, the driving speed is greater. In this case, use can be made, for example, of a linear characteristic, i.e. the blower speed n is increased linearly in accordance with the increase of the driving speed.

Since the control device 24 drives the fan, as illustrated in FIG. 2, when there is a switching-on signal, first of all, according to the invention, interventilation takes place, by means of which the initially weak heating of the heating element 39 is optimally used for heating the air flow. As a result, even directly after the air supply mechanism is switched on, a gentle, but already pleasantly warm air flow is produced; an initial sensation of draft no longer occurs.

Figure 3:
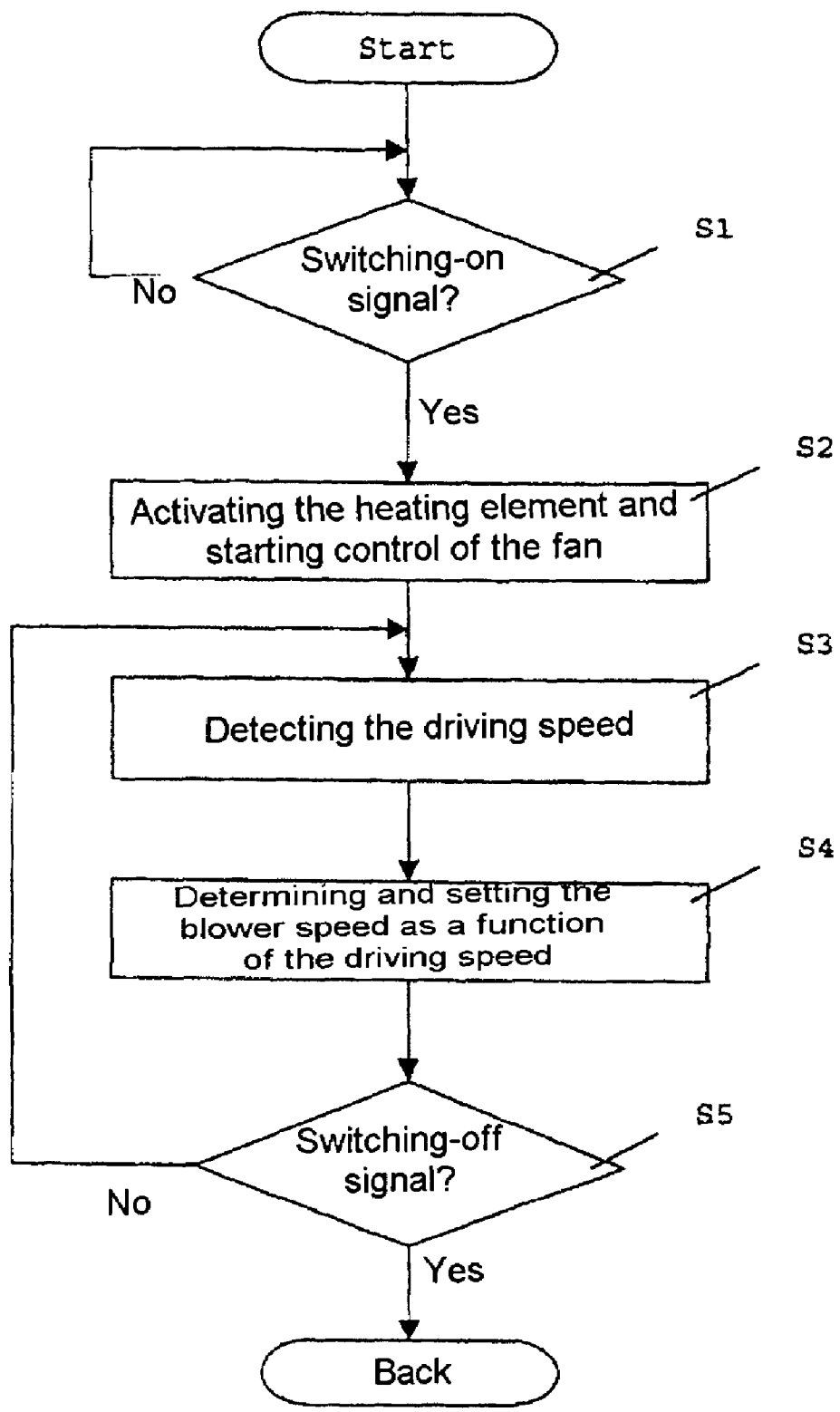
FIG. 3 shows a flow diagram of a method according to the invention for the operation of an air supply mechanism for a vehicle seat.

The sequence of the method according to the invention for the operation of an air supply mechanism for a vehicle seat will now be discussed below with reference to FIGS. 3 and 4.

In a first step S1, it is first of all checked whether there is a switching-on signal for an air supply mechanism for a vehicle seat. If this is not the case, a return is made to the beginning. If, however, it is recognized in step S1 that there is a switching-on signal for the air supply mechanism for a vehicle seat, a step S2 is advanced to, in which the heating element 39 and a starting control of the fan 38 are activated.

Figure 4:
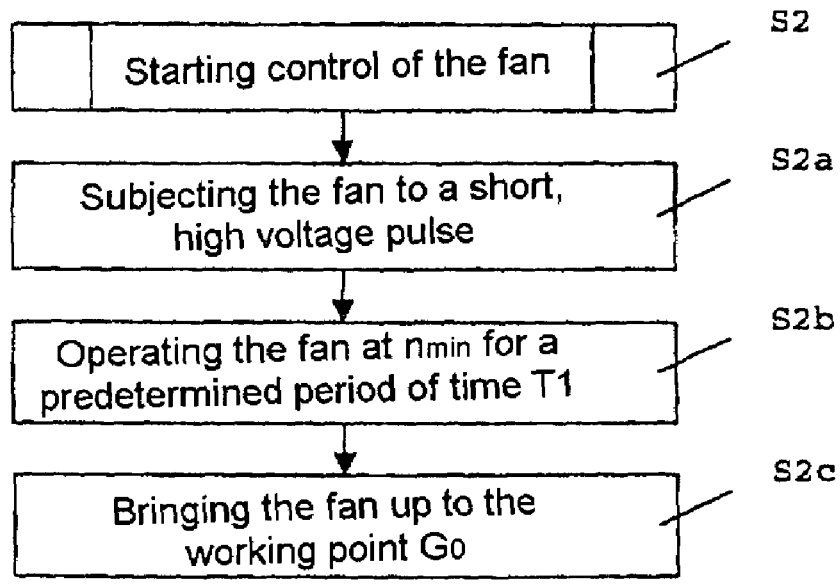
FIG. 4 shows a flow diagram of the fan starting control according to the invention, shown in FIG. 3.

The starting control of the fan 38 is illustrated in more detail in FIG. 4. First of all, in a step S2a, the fan 38 is subjected by the control device 24 to a short, high voltage pulse which is precisely of sufficient magnitude and length in order to start the fan 38. Subsequently, in a step S2b, the driving voltage of the fan 38 is reduced to an operating minimum, so that the fan 38 is operated at a minimum blower speed $n_{min}$. This driving voltage is kept constant for a predetermined period of time T1, the length of which period of time corresponds to the duration of time required until the heating element 39 has reached its full heating power. When the predetermined period of time T1 has elapsed, in step S2c, the driving voltage of the fan 38 and therefore the blower speed n are brought up to a predetermined working point $G_0$.

This predetermined working point $G_0$ can be selected and updated in steps (not shown). For this purpose, an external parameter value, such as, for example, the external temperature, can be detected and, in accordance with this detected external temperature, a working point $G_0$ can be selected from previously stored working points. In addition, the working point $G_0$ can be updated by a check being made at regular intervals during the driving mode to see whether there is a change in parameter, i.e., for example, a change in the external temperature, and, if this is the case, the working point is adapted.

Starting from this predetermined working point $G_0$, then, in the following steps S3 to S5, shown in FIG. 3, the driving speed (S3) is detected and the blower speed n is determined and set as a function of the driving speed (S4) in such a manner that, by means of the air flow generated by the air supply mechanism for a vehicle seat, turbulence in the head and neck region of the seat occupant is compensated for or at least reduced. Steps S3 and S4 are repeated until it is recognized, in step S5, that there is a switching-off signal for the air supply mechanism.

The invention claimed is:

1. An air supply mechanism for a vehicle seat, with an air discharging opening which is provided in an upper region of the vehicle seat and via which a head, shoulder, and neck region of a vehicle occupant can be subjected to an air flow in order to reduce undesirable draft phenomena, comprising:
- a fan,
- a heating element, and
- a control device, which regulates an airflow of the fan by regulating a blower speed of the fan,
- wherein the airflow is heatable via the heating element, and
- wherein the control device is designed so that, in response to a switching-on signal for the air supply mechanism, the heating element is switched on and the fan is started by way of a short high voltage pulse, the fan is operated at minimum blower speed by way of an operating voltage below said short high voltage pulse for a predetermined period of time after the fan has started, and the fan is operated as a function of driving speed after said predetermined period of time has passed.

2. The air supply mechanism as claimed in claim 1, wherein the fan is operated at the lowest blower speed for said predetermined period of time, and wherein an operating voltage is then brought up to a predetermined working point after said predetermined period of time has passed.

3. The air supply mechanism as claimed in claim 2, wherein the short, high voltage pulse is designed in such a manner that it is precisely sufficient to allow the fan to start.

4. The air supply mechanism as claimed in claim 2, wherein the predetermined period of time is designed in such a manner that the heating element can be completely heated up within that predetermined period of time.

5. The air supply mechanism as claimed in claim 2, wherein the control device selects the predetermined period of time as a function of a determined external temperature, and wherein new determinations take place at regular intervals.

6. The air supply mechanism as claimed in claim 1, wherein the predetermined period of time is designed in such a manner that the heating element can be completely heated up within that predetermined period of time.

7. A method for operating an air supply mechanism for a vehicle seat, with an air discharging opening provided in an upper region of the vehicle seat and via which a head, shoulder and neck region of a seat occupant can be subjected to an air flow in order to reduce undesirable draft phenomena, the air flow being regulatable with a control device by regulating a blower speed of a fan and heatable via a heating element, comprising:
- detecting whether there is a switching-on signal for the air supply mechanism, and if there is no switching-on signal, returning to a beginning of the method,
- switching on the heating element and starting the fan by way of a short high voltage pulse when the switching-on signal is present,
- operating the fan at minimum blower speed by way of an operating voltage below said short high voltage pulse for a predetermined period of time after the fan has started,
- detecting a driving speed of the vehicle,
- operating the fan, and therefore the blower speed, as a function of the driving speed after said predetermined period of time has passed, and
- checking whether a switching-off signal is present, and then returning to the beginning of the method when the switching-off signal is present, and again detecting the driving speed of the vehicle and operating the fan as a function of the driving speed when the switching-off signal is absent.

8. The method of claim 7, wherein, after expiry of the predetermined period of time, the fan is driven at an increasing operating voltage, so that the blower speed is brought up to a predetermined working speed.

9. The method as claimed in claim 8, further comprising automatically detecting an external parameter value in a first additional step, and setting the working point of the fan as a function of the external parameter in a second additional step.

10. The method as claimed in claim 7, further comprising automatically detecting an external parameter value in a first additional step, and setting the working point of the fan as a function of the external parameter in a second additional step.

11. The method as claimed in claim 10, wherein the external parameter value is an external temperature.

12. The method as claimed in claim 10, wherein the first and second additional steps are carried out anew at regular intervals during a driving mode.

* * * * *